L. SUTHERLAND.
BRAKE SYSTEM.
APPLICATION FILED JUNE 4, 1910.

1,028,301.

Patented June 4, 1912.

2 SHEETS—SHEET 1.

Witnesses:
Chas. F. Bassett
C. R. Benjamin

Inventor
Luke Sutherland
By Frederick Benjamin
Atty.

COLUMBIA PLANOGRAPH CO., WASHINGTON, D. C.

L. SUTHERLAND.
BRAKE SYSTEM.
APPLICATION FILED JUNE 4, 1910.

1,028,301.

Patented June 4, 1912.

2 SHEETS—SHEET 2.

Witnesses:
Chas. F. Bassett
C. B. Benjamin

Inventor
Luke Sutherland
By Frederick Benjamin
Atty.

UNITED STATES PATENT OFFICE.

LUKE SUTHERLAND, OF LOUISVILLE, KENTUCKY.

BRAKE SYSTEM.

1,028,301.  Specification of Letters Patent.  Patented June 4, 1912.

Application filed June 4, 1910.  Serial No. 564,977.

*To all whom it may concern:*

Be it known that I, LUKE SUTHERLAND, citizen of the United States, residing at Louisville, in the county of Jefferson and State of Kentucky, have invented certain new and useful Improvements in Brake Systems, of which the following is a specification.

My invention relates to brake systems designed especially for use upon motor driven vehicles, and refers especially to apparatus in which compressed air is employed to operate the brake mechanism.

The chief objects of the improvements which constitute the subject matter of this application for patent are, to provide a simple, durable, and compact pneumatically operated device for the purpose stated; to furnish mechanical movements by means of which the brake mechanism may be quickly set and to produce an appliance for the purposes sought that may be readily applied to motor operated vehicles of any type now in use.

Other objects are to furnish a quick acting valve for controlling the motive power supplied to the brake mechanism; to provide means whereby the operator may regulate at will the force applied to the brake, and to arrange the operating lever and connections in such a manner that the inlet and outlet ports of the valve may be controlled by the movement of a single member.

I accomplish the desired results by employing the apparatus illustrated in the accompanying drawings, which form a part of this application, the assembled relation of the coöperating parts, and details of construction being disclosed in the following views:—

Figure 1:
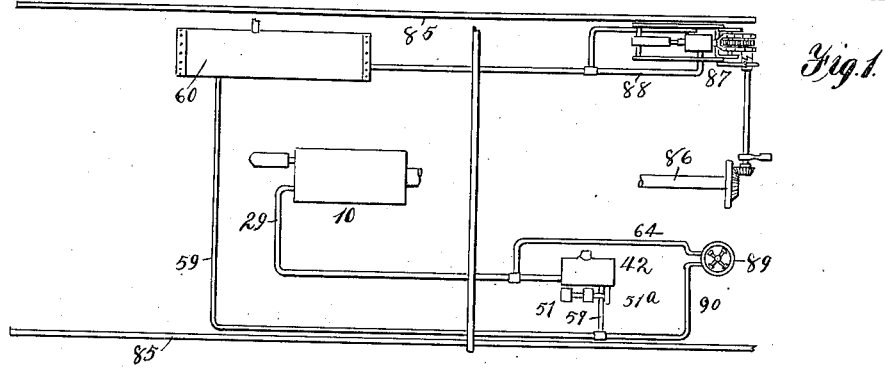
Figure 2:
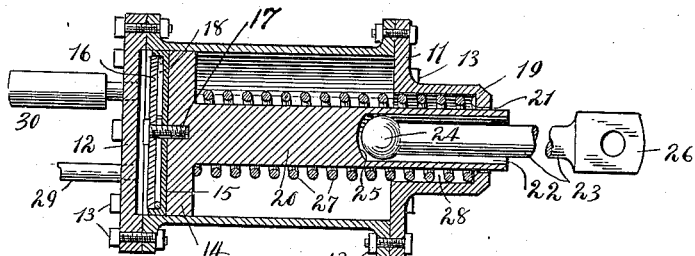
Figure 3:
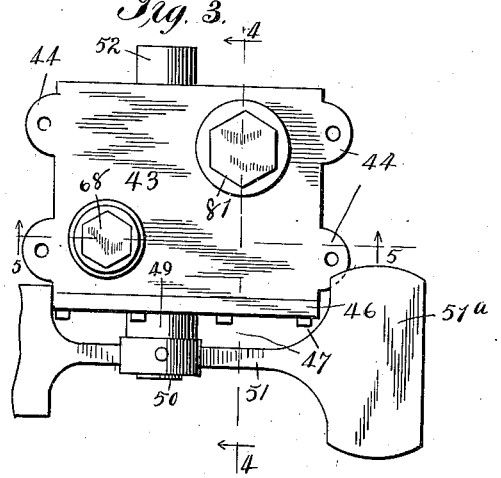
Figure 4:
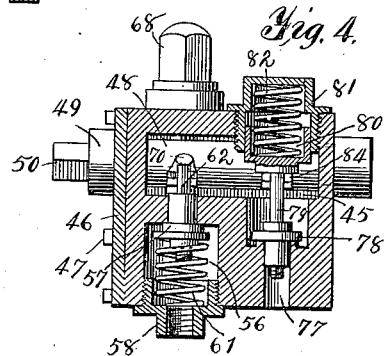
Figure 5:
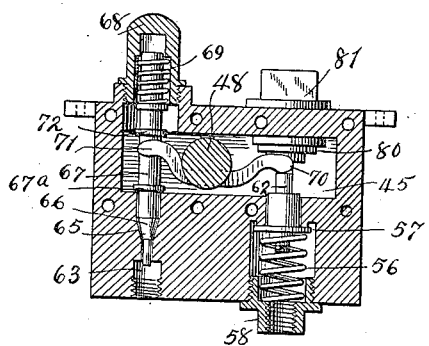
Figure 6:
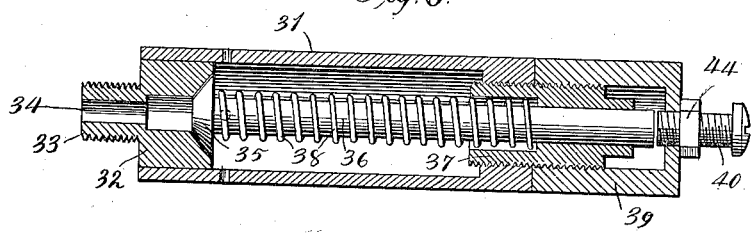
Figure 7:
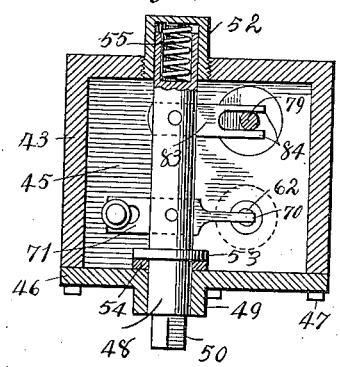

Figure 1 is a diagrammatic view of a brake system embodying my improvements, the parts being assembled in relation to the frame of an automobile, only such portion of the latter being shown as will suffice to illustrate the relation of the brake devices thereto; Fig. 2 is a longitudinal sectional view of the brake cylinder; Fig. 3 is a top plan view of the brake valve; Fig. 4 is a sectional view of the brake valve on the line 4—4 of Fig. 3, with the foot lever removed; Fig. 5 is a sectional view of the brake valve on the line 5—5 of Fig. 3; Fig. 6 is an enlarged view showing the pop valve in longitudinal section, and Fig. 7 is a sectional view taken on a horizontal plane passing through the axis of the valve rock shaft.

Referring to the details of the drawing, the numeral 10 indicates a cylindrical shell, closed by front and rear heads, designated 11, and 12, respectively, and secured to the cylinder by bolts 13, in the usual manner. Within the cylinder 10 is arranged a piston 14, provided with a cupped leather washer 15 secured to the rear face of the piston by a follower plate 16 and stud bolt 17, an expansible ring 18 being interposed between the plate and said washer to keep the latter pressed firmly against the inner wall of the cylinder. The front cylinder head 11 is furnished with a central boss or extension 19, and the piston has an integral rod 20 which projects through an aperture 21 in said boss, having a sliding fit therein. The end of the said rod is counter-bored for a suitable distance to form a socket as indicated at 22, to receive an extension 23, which is loosely mounted in said bore, and has a ball 24 at the end engaging the concave bottom 25 of the counterbore. The projecting end of the extension or shaft 23 is provided with a fork 26 adapted to be attached to a brake shaft, or other part of the brake mechanism, and the shaft is of less diameter than the bore, thus permitting the piston shaft to adjust itself to the movement of the brake shaft without binding in its seat. The piston is normally held in retracted position as shown in Fig. 2 by a spring 27 which surrounds the piston stem or rod 20. The boss 19 of the front cylinder head is counterbored as shown at 28, to receive the end of said spring, thus permitting the latter to be of greater length than the cylinder so as to allow a full stroke of said piston.

The piston is extended to operate the brake shaft by introducing air under pressure behind the head 14 through an inlet pipe 29, which passes through an opening in the back cylinder head 12. In order to relieve the cylinder from an overcharge of air, a pop valve 30 is inserted into said head 12, and communicates with the space behind the piston. The construction of this valve is clearly shown in Fig. 6. A hollow cylinder 31 is provided at one end with a tightly fitting plug 32 having a threaded nipple 33, which engages a hole in the cylinder head 12. This plug is bored axially as indicated at 34, and the inner end is formed into a seat to receive a conical valve 35 provided with a stem 36 which passes through an adjusting nut 37 screwed into the other end of the cylinder 31. A comparatively strong spring 38 surrounds the stem 36 and tends to hold the valve disk 35 firmly seated. The said adjusting nut 37 extends beyond the end of the cylinder 31 and is engaged by a cap 39 which is internally threaded to engage the nut. The said cap is furnished with a stop screw 40 which passes through the end of the cap and is in alinement with the valve stem. This screw is provided with a jam nut 41 and its purpose is to limit the lift of the valve 35.

In order to properly regulate the air supply to the brake cylinder 10, I provide a brake valve, designated hereinafter in its entirety by the reference numeral 42. This valve comprises a casing consisting of a casting 43 having attaching ears 44, and provided with a rectangular chamber 45, arranged in the upper portion of said casting. This chamber is open upon one side which is normally closed by a plate or cover 46, secured by cap screws 47. Extending horizontally through the said chamber 45 is a rock shaft 48 having one end projecting through a boss 49, formed on the cover 46, the external end 50 of the shaft being squared to receive a foot lever 51. The opposite end of said rock shaft is journaled in a cap 52, which is screwed into a threaded opening in the casting 43. A collar 53 (Fig. 7) is secured to the shaft near the cover plate 46 and between said collar and the plate is interposed a leather washer 54. The end of the shaft which lies within the cap 52 is counterbored to receive a spring 55 which tends to hold the collar 53 against the washer 54 and thus produce an air tight joint and prevent leakage of air from the chamber when the shaft is operated.

The chamber 45 is provided with an inlet passage 56, guarded at the upper end by a valve 57, and having a threaded nipple 58 at its lower end to form a convenient connection for an air supply pipe 59 (Fig. 1) which is connected with a suitable storage tank or reservoir 60, containing air under pressure. The said valve 57 is held on its seat by a spring 61, and is provided with a stem 62 which projects into the chamber 45. Arranged upon the opposite side of the rock shaft is an outlet passage 63, connected by the pipe 29 with the brake cylinder 10. This outlet passage is contracted, as indicated at 65, to form a suitable seat for a conical graduating valve 66, provided with a stem 67, which passes through the chamber 45 and has its upper end projecting into a cap 68, screwed into an opening in the upper wall of the chamber. A spring 69 urges the valve downward while a shoulder 67$^a$ acts as a stop to prevent the said valve from being entirely closed, so that a slight quantity of air may pass the valve when at its lowest point. The inlet valve 57 and the graduating valve 66 are operated in unison by fingers 70, 71, carried by the rock shaft 48. The finger 70 projects above the end of the valve stem 62, while the finger 71, extending in the opposite direction from the rock shaft is bifurcated at the end forming a fork which embraces the stem 67 of the graduating valve below a collar 72, fixed on said stem. It will be evident that when the shaft 48 is rocked in a direction to depress the finger 70, the inlet valve 57 will be opened, while the finger 71 will engage the collar 72 and lift the graduating valve from its seat, thus opening communication between the chamber 45 and the brake cylinder 10. In addition to the air passages already described, the said chamber 45 is provided with an outlet or exhaust passage 77 which is controlled by a valve 78 having a stem 79 which extends into the said chamber. The upper end of this stem 79 carries a hollow head or cup 80 which is fitted to slide in a cap 81, having threaded engagement with an aperture in the upper wall of the chamber 45. This cup is engaged by a spring 82 which urges the said valve 78 upon its seat in the passage 77. This exhaust valve is operated by a finger 83 attached to the rock shaft 48, and provided with a fork 84 at the extremity, which straddles the stem 79 and engages the under side of the cup 80, so that when the stem 79 is elevated by rocking the shaft 48 the valve 78 will be opened while it will not be affected by a movement of the shaft in the opposite direction.

The manner of assembling the various coöperating mechanisms which constitute my brake system, and their relation to the brake shaft of a vehicle are shown in Fig. 1. The numeral 85 indicates the side members of a vehicle, 86 the motor shaft and 87 an air compressor of any approved type connected in any suitable manner with the said shaft 86. The air compressor is connected by a pipe 88 with the reservoir 60, and the latter communicates with the brake valve by means of the pipe 59 previously mentioned. One side of a duplex air gage 89 is connected by a branch pipe 90 with the supply pipe 59 so that it will constantly register the amount of pressure in the reservoir, and another pipe 64 connects the other side of said gage with the pipe 29 leading to the brake cylinder, so that the driver may always know how much pressure he has on the brakes.

The air compressor and duplex gage are not described in detail herein, since they form no part of the present invention.

The operation of the apparatus when assembled and connected in the manner herein described is as follows:—Upon starting the motor the air pump 87 will be set in motion and will continue to work until the maximum pressure is obtained, when the said pump will be automatically disconnected from the motor shaft, the mechanism employed for this purpose not being shown since it forms no part of the present invention. The air in the reservoir being thus at a sufficient pressure, to apply the brake the operator places his foot upon the lever 51, with the toe resting upon the plate 51ª, and opens the inlet valve 57 by depressing the said plate. As previously explained, this toe stroke will at the same time open the graduating valve 66 and permit the air to pass through the pipe 29 to the brake cylinder. When a light application of air is desired a slight depression is made with the toe of the lever which will admit sufficient air without disturbing the graduating valve, there being a slight lost motion between the finger 71 and collar 72. When, however, a stronger application of the brakes is required a further depression of the toe plate 51ª will raise the said valve 66 and allow a greater flow of air to the brake cylinder 10. To make an emergency application the toe plate is depressed to its full extent which will completely open the valve and permit a maximum flow of air to the brake cylinder. The exhaust valve 78 is opened by a heel stroke of the said foot lever 51, the inlet and graduating valves being automatically closed by their respective springs, supplemented by the air pressure.

Having thus described my invention, what I claim as new, is:—

1. In a pneumatic brake, the combination of a cylinder, a piston in said cylinder, a spring for the piston, a piston rod, an extension for said rod adapted to be connected with the brake mechanism of a vehicle, connection between said cylinder and a supply of air under pressure, means for controlling the supply of air to said cylinder, said means comprising a chamber having inlet and outlet passages, pipes connecting the inlet passage with the source of air supply, and one of the outlet passages with the said cylinder, valves controlling said inlet and outlet passages, one of said valves being constantly open, and means for operating said valves.

2. In an apparatus for the purpose specified, a fluid controlling mechanism comprising three valves, a rock shaft provided with a plurality of fingers, two of said fingers adapted to operate two of said valves when the shaft is rocked in one direction, and another of said fingers adapted to operate the other valve when the shaft is operated in the opposite direction.

In testimony whereof I affix my signature in the presence of two witnesses.

LUKE SUTHERLAND.

Witnesses:
S. H. BARBER,
CLAY MILLER.

---

Copies of this patent may be obtained for five cents each, by addressing the "Commissioner of Patents, Washington, D. C."